United States Patent
Ramalingam et al.

(10) Patent No.: US 9,558,424 B2
(45) Date of Patent: Jan. 31, 2017

(54) ON-ROAD STEREO VISUAL ODOMETRY WITHOUT EXPLICIT POSE DETERMINATIONS

(71) Applicant: Mitsubishi Electric Research Laboratories, Inc., Cambridge, MA (US)

(72) Inventors: Srikumar Ramalingam, Cambridge, MA (US); Gim Hee Lee, Belmont, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 13 days.

(21) Appl. No.: 14/755,324

(22) Filed: Jun. 30, 2015

(65) Prior Publication Data

US 2017/0004379 A1 Jan. 5, 2017

(51) Int. Cl.
- *G06K 9/00* (2006.01)
- *G06K 9/52* (2006.01)
- *G06T 11/20* (2006.01)
- *G06T 7/20* (2006.01)
- *G06T 7/00* (2006.01)
- *B25J 9/16* (2006.01)

(52) U.S. Cl.
CPC .............. *G06K 9/52* (2013.01); *G06K 9/00791* (2013.01); *G06T 7/20* (2013.01); *G06T 7/2086* (2013.01); *G06T 11/206* (2013.01); *B25J 9/1697* (2013.01); *G06T 7/0075* (2013.01)

(58) Field of Classification Search
None
See application file for complete search history.

(56) References Cited

U.S. PATENT DOCUMENTS

| | | | |
|---|---|---|---|
| 2012/0121161 A1* | 5/2012 | Eade | G09B 29/007 382/153 |
| 2012/0300979 A1* | 11/2012 | Pirchheim | G06T 7/2033 382/103 |
| 2012/0308114 A1 | 12/2012 | Othmezouri et al. | |

(Continued)

FOREIGN PATENT DOCUMENTS

WO 2014130404 A 8/2014

OTHER PUBLICATIONS

D. Nister, An efficient solution to the five-point relative pose problem, PAMI 2004.

(Continued)

*Primary Examiner* — Shervin Nakhjavan
(74) *Attorney, Agent, or Firm* — Gene Vinokur; James McAleenan; Hironori Tsukamoto

(57) ABSTRACT

A method determines motion between first and second coordinate systems by first extracting first and second sets of keypoints from first and second images acquired of a scene by a camera arranged on a moving object. First and second poses are determined from the first and second sets of keypoints. A score for each possible motion between the first and the second poses is determined using a scoring function and a pose-transition graph constructed from training data where each node in the post-transition graph represents a relative pose and each edge represents a motion between two consecutive relative poses. Then, based on the score, a best motion is selected as the motion between the first and second coordinate systems.

14 Claims, 3 Drawing Sheets

(56) References Cited

U.S. PATENT DOCUMENTS

| | | | |
|---|---|---|---|
| 2014/0270540 A1* | 9/2014 | Spector | G06T 7/0087 382/199 |
| 2015/0125045 A1* | 5/2015 | Gauglitz | G06T 7/2033 382/107 |
| 2015/0234477 A1* | 8/2015 | Abovitz | G06K 9/00671 382/103 |
| 2015/0281509 A1* | 10/2015 | Legakis | H04N 5/23264 348/231.2 |
| 2015/0286873 A1* | 10/2015 | Davis | G06F 3/00 382/103 |

OTHER PUBLICATIONS

B. Kitt, A. Geiger, and H. Lategahn, Visual odometry based on stereo image sequences with ransac-based outlier rejection scheme, IV, 2010.

A. Milella and R. Siegwart, Stereo-based ego-motion estimation using pixel tracking and iterative closest point, ICCVS, 2006.

Hartmann et al., Predicting Matchability, CVPR 2014. http://www.cv-foundation.org/openaccess/content_cvpr_2014/papers/Hartmann_Predicting_Matchability_2014_CVPR_paper.pdf.

Bastien Steder et al. "Place recognition in 3D scans using a combination of bag of words and point feature based relative pose estimation," Intelligent robots and systems, 2011 IEEE RSJ International Conference ON, Sep. 25, 2011. pp. 1249-1255.

Konolige et al. "Towards lifelong visual maps," Intelligent robots and systems, IROS 2009, IEEE RSJ International Conf On. IEEE. Oct. 10, 2009. pp. 1156-1163.

Kosecka et al. "Global Localization and relative positioning based on scale-invariant keypoints," Robotics and autonomous systems, elsevier science publishers, Amsterdam, NL. vol. 52, No. 1, Jul. 31, 2005. pp. 27-38.

Giorgio Grisetti et al. "A tutorial on Graph-based SLAM," IEEE Intelligent Transportation systems magazine, IEEE, USA. vol. 2, No. 4, Jan. 1, 2010. pp. 31-43.

* cited by examiner

ON-ROAD STEREO VISUAL ODOMETRY WITHOUT EXPLICIT POSE DETERMINATIONS

FIELD OF THE INVENTION

The invention is generally related to computer vision, and more particularly to determining motion between two coordinate systems of on-road vehicles using feature point correspondences, where each coordinate system corresponds to a camera coordinate system of a camera, e.g., a monocular or stereo camera.

BACKGROUND OF THE INVENTION

Visual odometry refers to the problem of determining a motion of a moving object, e.g., a vehicle or a robot, from one position to another using features from images acquired by, e.g., one or more camera mounted on the object. Numerous methods are known for estimating the motion using geometric primitives, such as points. For example, one can determine the motion using correspondences between 2D points in one coordinate system to another coordinate system using 5 or more point correspondences, see Nister, "An efficient solution to the five-point relative pose problem," PAMI, 2004.

There are also 2D to 3D pose estimation methods used to estimate the position of a moving object based on partial 3D point cloud reconstructed by the previous stereo images, Kitt et al., "Visual odometry based on stereo image sequences with ransac-based outlier rejection scheme," IV, 2010.

One method uses 3D to 3D point correspondences in an iterative closest point (ICP) method for determining motion between stereo cameras, Milella et al., "Stereo-based egomotion estimation using pixel tracking and iterative closest point, ICCVS, 2006.

Voting strategies have been used for computing visual odometry, U.S. 20120308114, "Voting strategy for visual ego-motion from stereo," and machine learning procedures have been used to estimate the camera pose WO 2014130404, "Method and device for calculating a camera or object pose."

SUMMARY OF THE INVENTION

The embodiments of the invention provide a method for determining a motion between a first coordinate system and a second coordinate system. The method constructs a compact pose-transition graph from training data. The graph can be used to obtaining visual odometry without performing any explicit motion or pose determination.

Typically motion or pose estimation involves the solution of a polynomial system of equations. The method does not require any algebraic system of equations to obtain the pose. Instead, method simply searches the pose-transition graph for a best motion. In the pose-transition graph, each node represents a possible relative pose between two consecutive camera positions. An edge between two relative poses represents the possibility of having the two relative poses in consecutive frames while doing visual odometry.

The method is distinct from other methods for visual odometry that use motion estimation procedures, such as 3- or 5-point pose estimation.

The method uses a scoring function that determines a distance metric based on point correspondences that can efficiently identify the correct motion from the pose-transition graph.

DETAILED DESCRIPTION OF THE PREFERRED EMBODIMENTS

Figure 1:
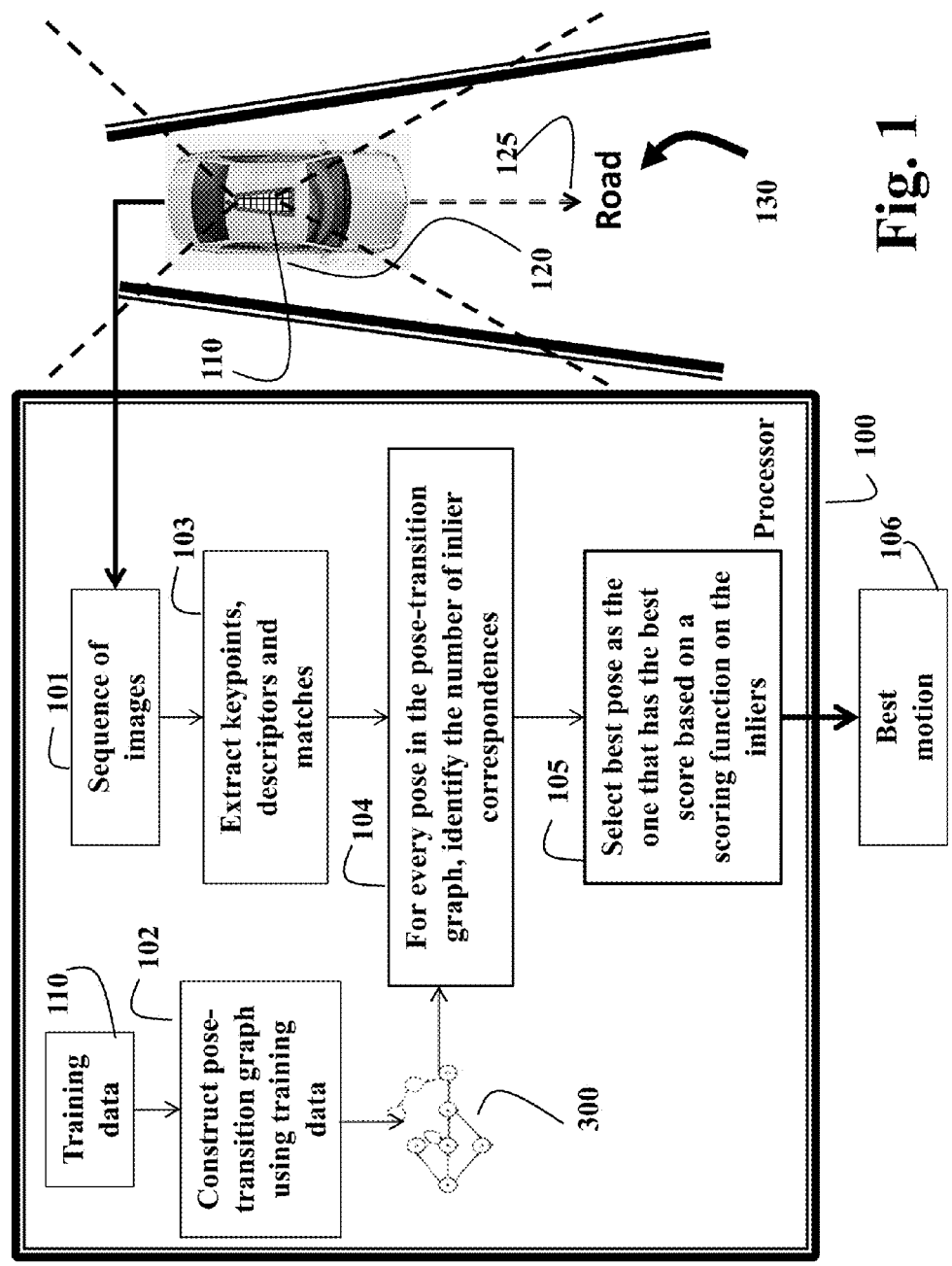
FIG. 1 is a flow diagram of a method for determining a motion between the first and second coordinate system used in our visual odometry procedure according to embodiments of the invention.

As shown in FIG. 1, the embodiments of the invention provide a method for determining a motion between a first coordinate system and a second coordinate system. For example, the method can be used for visual odometry applications, where the method determines a motion of a moving object 110, e.g., a vehicle or a robot, from one position to another using features from images of a scene 130 acquired by, e.g., one or more cameras 120 mounted on the object.

Figure 3:
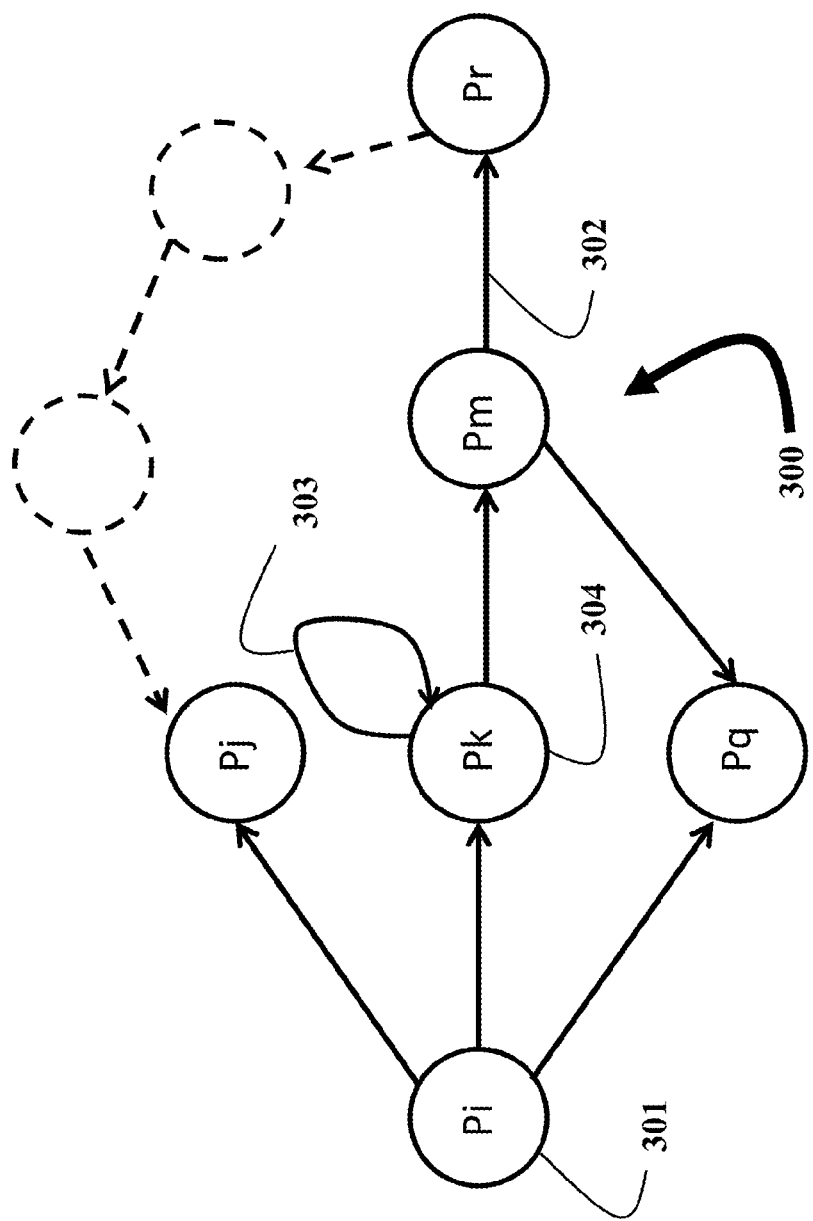
FIG. 3 shows a post-transition graph for possible relative poses between two consecutive frames according to embodiments of the invention.

The method uses a compact pose-transition graph 300 that is constructed from training data 110, see FIG. 3. This graph can then be used to obtaining visual odometry without performing any explicit motion or pose determination.

Most prior art visual odometry methods use explicit motion or pose determination by solving polynomial equations in a random sample consensus (RANSAC) method.

We do not use explicit motion determination, and we do not use RANSAC. Our approach "searches" for a relative pose using the pose-transition graph and point correspondences, instead of determining the correspondences directly.

Input to our method is a sequence of images 101 acquired by the camera, which is calibrated. From the sequence of images, we extract 103 keypoints, descriptors of the keypoints, to determine matching keypoints.

During training, we construct 102 the pose-transition graph 300 from the training data 110. The pose-transition graph 300 represents possible motion hypotheses. In this graph, every node represents a candidate for relative pose between two consecutive images in the video acquired of the scene 130 by, e.g., the camera 120 arranged on the vehicle 110. Each edge connecting two nodes represents the possible motion between two consecutive relative poses.

In order to do this, we use thousands of ground truth relative poses acquired by a camera mounted on the moving 125, e.g., the vehicle 110 on the road 130. These relative poses are clustered and compressed by removing redundant poses. Using the compressed set of poses, we construct a compact graph that encodes the state transition from one relative pose to another.

For every image in the video, we detect keypoints using conventional keypoint detectors, such as Speeded Up Robust Features (SURF). We also extract SURF descriptors, and match all consecutive pairs of images in step 103.

For every relative pose in the pose-transition graph, we identify 104 a number of inlier matches that are consistent as shown in step 105.

We use a scoring function on the inliers to determine a distance metric that yields a score. The distance metric identifies a best motion 106, which can be outputted.

The method can be performed in a processor connected to memory and input/output interfaces by buses as known in the art.

Figure 2:
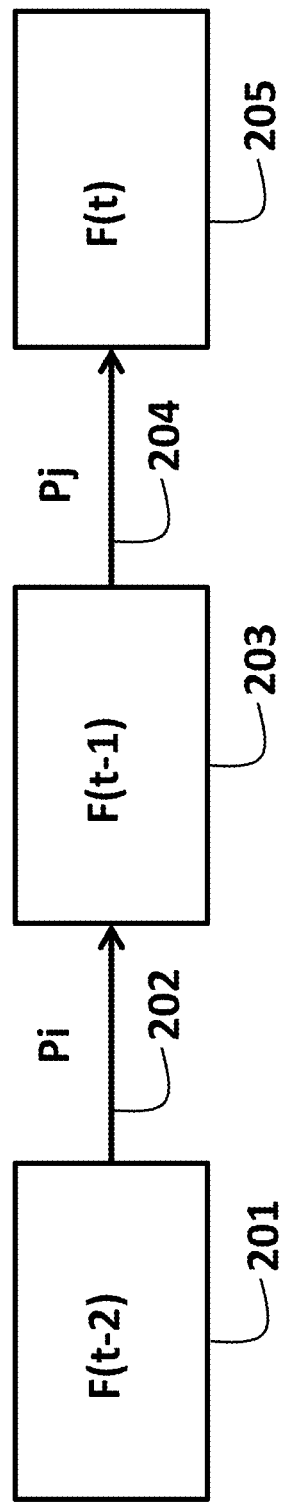
FIG. 2 is a schematic of three consecutive images and two consecutive relative poses according to embodiments of the invention.

As shown in FIG. 2, we show three consecutive images F(t−2) 201, F(t−1) 203, and F(t) 205 respectively. The relative pose between images F(t−2) and F(t−1) is given by Pi 202. Similarly, the relative pose between images F(t−1) and F(t) is given by Pj 204.

As shown in FIG. 3, we describe the basic idea used in constructing the post-transition graph 300 during training. In this graph, every node represents a candidate for relative pose between two consecutive images in the video acquired of the scene 130 by, e.g., the camera 120 arranged on the vehicle 110. Each edge connecting two nodes represents the possible motion between two consecutive relative poses.

For example, in FIG. 3, the edge 302 represents the possible motion that corresponds to having a relative pose Pr after the relative pose Pm. In other words, as shown in FIG. 2, there are three images F(t−2) 201, F(t−1) 203, and F(t) 125, such that the relative pose between F(t−2) and F(t−1) is Pm, and the relative pose between F(t−1) and F(t) is Pr. The loop 303 on node Pk 304 indicates that there could be two consecutive relative poses that are both equal to the relative pose Pk.

The post-transition graph is constructed using the training video sequences, i.e., training data 110. We use an analytical motion estimation procedures and bundle adjustment machinery to obtain the relative poses between consecutive frames. In other words, we use conventional analytical relative and absolute pose estimation procedures for generating the ground truth.

We can also obtain the relative pose information for training data using a global positioning system (GPS) and or an inertial measurement unit (IMU). Let Qi, where i={1, 2, ..., m}, be the relative poses from all pairs of consecutive images from the training data. Then, we cluster these poses such that all relative poses that are similar belong to one cluster, and use one representative relative pose from each cluster. By doing this, we obtain a smaller set of relative poses Pi, where i={1, 2, ..., n} where n<<m.

Using this smaller set of relative poses, we construct the transition graph shown in FIG. 2 in the following manner:
1. Initialize n nodes, where each node corresponds to a relative pose in the set Pi, i={1, 2, ..., n}.
2. For every consecutive relatives poses Qi and Qj:
   a. If the nearest relative poses in the compressed set are Pi and Pj, then we add an edge from Pi to Pj.
   b. If the nearest relative poses in the compressed set are both Pk, then we add a self-loop for the node Pk.

Let F(t−2), F(t−1) and F(t) be three consecutive images. Let the relative pose between F(t−2) and F(t−1) be given by Pi. In order to determine the current relative pose Pj between F(t−1) and F(t), we use the following scoring function $$\text{Score}(Pj) = \text{inliers}(Pj) + S^* w(Pi, Pj),$$

where S is the scaling parameter that adjusts the relative importance of inliers and w. The parameter S can be either learned or fixed manually. The inliers (Pj) are obtained using the relative pose Pj. The weight corresponding to the state transition from Pi to Pj is w(Pi,Pj).

The method can be used in a number of applications including, but not limited to cars in autonomous driving applications, such as precise localization and visual odometry for mobile robots, hand-held devices and drones.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A method for determining a motion between a first coordinate system and and a second coordinate system, comprising steps of:
    extracting a first set of keypoints from a first image acquired of a scene by a camera arranged on a moving object;
    extracting a second set of keypoints from a second image acquired of the scene by the camera;
    determining first and second poses from the first and second sets of keypoints, respectively;
    determining a score for each possible motion between the first and the second poses using a scoring function and a pose-transition graph constructed from training data where each node in the post-transition graph represents a relative pose and each edge represents a motion between two consecutive relative poses; and
    selecting, based on the score, a best motion as the motion between the first and second coordinate systems, wherein the steps are performed in a processor.

2. The method of claim 1, wherein the keypoints are obtained using Speeded Up Robust Features (SURF).

3. The method of claim 1, wherein the pose-transition graph is constructed using training data obtained from a video sequence acquired by the camera.

4. The method of claim 1, wherein the poses represented in the pose-transition graph are determined using an analytical motion estimation procedure.

5. The method of claim 4, wherein the relative motions are obtained using analytical motion estimation and 5-point 2D to 2D motion estimation procedure.

6. The method of claim 4, wherein the relative motions are obtained using analytical motion estimation and 3-point 2D to 3D motion estimation procedure.

7. The method of claim 1, wherein the poses are determined using a geographical positioning system (GPS).

8. The method of claim 1, wherein the poses are determined using an inertial measurement unit (IMU).

9. The method of claim 1, wherein the poses are clustered to remove similar motions to construct a compact pose-transition graph.

10. The method of claim 1, wherein the scoring function depends on a number of inliers obtained from matching the first set of keypoints and the second second set of keypoints.

11. The method of claim 1, wherein the motion is used for the task of visual odometry.

12. The method of claim 1, wherein the motion is used for the task of localization using a 3D model of the scene.

13. The method of claim 1, wherein the moving object is a vehicle.

14. The method of claim 1, wherein the moving object is a robot.

* * * * *